United States Patent [19]

Lyall

[11] Patent Number: 4,529,983
[45] Date of Patent: Jul. 16, 1985

[54] APPARATUS AND METHOD FOR THE CORRECTION OF ATTENUATION-INDUCED ERRORS IN A WEATHER RADAR RECEIVER

[75] Inventor: James R. Lyall, Douglas County, Kans.

[73] Assignee: King Radio Corporation, Olathe, Kans.

[21] Appl. No.: 412,913

[22] Filed: Aug. 30, 1982

[51] Int. Cl.³ .............................................. G01S 13/95
[52] U.S. Cl. .................... 343/5 W; 343/5 SM
[58] Field of Search ........................... 343/5 SM, 5 W

[56] References Cited

U.S. PATENT DOCUMENTS 3,525,095  8/1970  Cordry .................. 343/5 SM X
4,435,707  3/1984  Clark ................... 343/5 SM X Primary Examiner—T. H. Tubbesing
Attorney, Agent, or Firm—Kokjer, Kircher, Bradley, Wharton, Bowman & Johnson

[57] ABSTRACT

Disclosed is a method and apparatus for adjusting the gain in a weather radar receiver to correct for precipitation induced transmission path attenuation. The receiver gain is controlled in a known manner to accommodate known path transmission effects. The gain controlling apparatus comprises fixed and variable AC resistances, where the variable AC resistance is an attenuator diode driven by a varying current source. The variable current source provides an approximation to a hyperbolically decreasing current when no video returns or echoes are present. However, upon sensing the existence of a video return indicative of rain at a moderate intensity, a portion of the charge on the RC networks in the current generator is shunted to ground, increasing the rate of change of current provided by the current source. This modification of the attenuator substantially reduces attenuation-induced receiver errors present within the sensitivity time control (STC) interval.

8 Claims, 4 Drawing Figures

APPARATUS AND METHOD FOR THE CORRECTION OF ATTENUATION-INDUCED ERRORS IN A WEATHER RADAR RECEIVER

BACKGROUND OF THE INVENTION

The present invention relates generally to radar receivers and specifically to the correction of attenuation-induced errors in a weather radar receiver.

A weather radar operates on the principle that electromagnetic radiation is scattered by water droplets present in a rainstorm and that the amount of scatter is proportional to the rain density and thus the intensity of the storm. Some of the scattered radiation is received by the radar receiver and is amplified, detected and processed therein. It is desirable that the output video signal from the radar receiver represent a measure of the intensity of the storm in terms of rain density.

The received signal has a power level which is dependent upon the equipment utilized, transmission path effects, and the target which is providing the radiation scattering. Because it is the target (rain density) which is of primary interest, it is desirable to correct for the effects of equipment and the transmission path factors to provide the most accurate output available within reasonable economic constraints. A particular problem is the attenuation of the transmitted and reflected radar signals due to the presence of rain in the transmission path.

A typical weather radar illuminates a storm with a pulse transmission from a narrow beam antenna. Assuming the storm is large enough or close enough, the storm will intercept the entire beam cross-section and the interaction region (the point at which we desire information on the rain density) will be a disk-shaped region with a thickness equal to one-half the speed of light c times the pulse duration.

It can be shown that the ratio of the full beam power, $P_r(R)$ incident on a region at range R to the power transmitted, $P_t$, is equal to the path transmission coefficient $\nu(R)$ and is given by Equation 1, where $\lambda'(R)$ is the effective volumetric loss coefficient of the target at the range R.

$$\frac{P_r(R)}{P_t} = \nu(R) = \exp\left[-\int_0^R \lambda'(R)dR\right] \quad (1)$$

In a pulsed system R is equal to the speed of light c times the pulse travel time t divided by 2 and thus Equation 1 becomes:

$$\nu(t) = \exp\left[-\frac{c}{2}\int_0^t \lambda'(t)dt\right] \quad (2)$$

It can be shown that the effective volumetric loss coefficient $\lambda'$ is given by Equation 3, where $\sigma$ is equal to the volumetric scattering coefficient and $K\lambda$ and $K\sigma$ are constants of proportionality relating $\lambda$ (volumetric loss or absorbtion coefficient) and $\sigma$ to rain density.

$$\lambda' = \sigma\left(1 + \frac{K\lambda}{K\sigma}\right) \quad (3)$$

substituting (3) into (2) we have $$\nu(t) = \exp\left[-\frac{c}{2}\left(1 + \frac{K\lambda}{K\sigma}\right)\int_0^t \sigma(t)dt\right] = \quad (4)$$

$$\exp\left[-W\int_0^t \sigma(t)dt\right]$$

where $W = \frac{c}{2}\left(1 + \frac{K\lambda}{K\sigma}\right)$, an empirical constant Due to attenuation of the signal normally caused along the transmission path (spreading loss), it is desirable to gradually increase the overall receiver gain as a function of time t such that received echo signals and their variation in strength are indications of the rain density at range R. In order to estimate the volumetric scattering coefficient $\hat{\sigma}$, it can be shown that the receiver transfer characteristic G (gain) should vary as a function of time as shown in Equation 5, where $A_r$ is equal to the effective aperature of the receiving antenna, and $\tau$ is the transmitted pulse duration $$G = \left(\frac{2\pi c}{P_t A_r \tau}\right)\left(\frac{t}{\nu(t)}\right)^2 = G_o\left(\frac{t}{\nu(t)}\right)^2 \quad (5)$$

where $G_o$ represents the constant component of receiver gain, dependent upon the particular radar system parameters, and $\gamma(t)$ is computed continuously as a function of the detected receiver output $\hat{\sigma}$ and can be computed by the blocks shown in FIG. 1. If properly computed, $\gamma(t)$ in (5) will effectively compensate for attenuation of the signal caused by precipitation in the transmission path.

SUMMARY OF THE INVENTION

It is therefore an object of the present invention to provide a method and apparatus for the correction of precipitation level estimation errors due to precipitation induced attenuation along the transmission path of a weather radar antenna system.

It is a further object of the present invention to provide an inexpensive correction of attenuation-induced errors in a radar receiver.

The above and other objects are achieved in accordance with the present invention by providing an attenuator circuit for the received signal and the appropriate control circuitry.

The attenuator comprises both fixed and variable AC resistances with the variable AC resistance determined by a variable current source driving an attenuating diode. The variable current source provides a hyperbolically decaying current (in the absence of received echoes) and a means for increasing the rate of decay of said hyperbolically decaying current in the presence of echoes (whereby the receiver gain approximates the expression given in (5)).

The detected video derived from the received signal is compared to a reference level to determine the presence of echoes which are indicative of a rain intensity exceeding the level corresponding to moderate rain. The comparator output drives a constant shunt path connected to one of the two RC circuits which generate the hyperbolically decaying current. Thus, the inclusion of the constant shunt path when the video indicates the rain intensity has exceeded the moderate rain level effectively modifies the receiver gain to accomodate changes in the path transmission coefficient caused by this level of rain.

Other and further objects of the invention, together with the features of novelty appurtenant thereto, will appear in the course of the following description.

BRIEF DESCRIPTION OF THE DRAWINGS

A more complete appreciation of the invention, and many of the attendant advantages thereof, will be readily apparent by reference to the accompanying drawings, wherein.

DETAILED DESCRIPTION OF THE PREFERRED EMBODIMENTS

Figure 1:
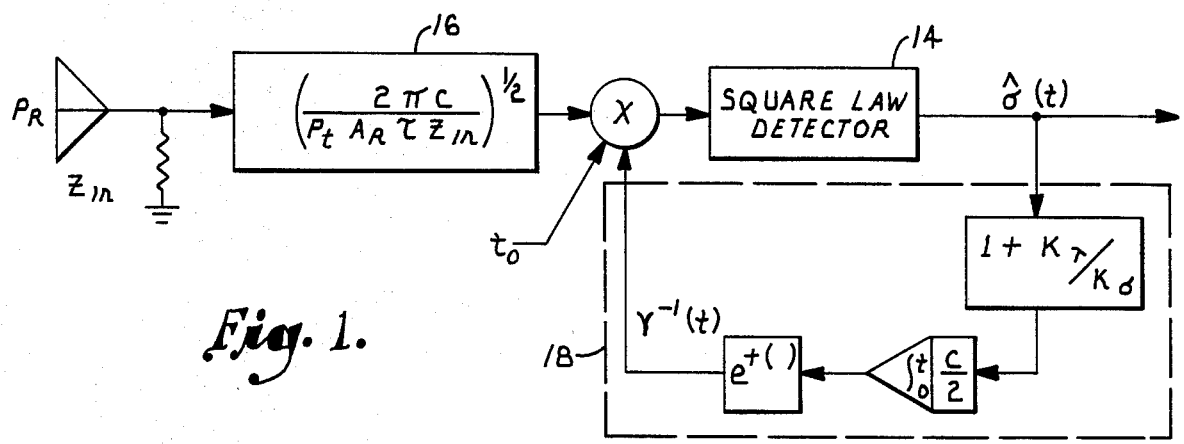
FIG. 1 is a block diagram representing the idealized weather radar receiver including the present invention.

FIG. 1 is an idealized weather radar receiver incorporating a fixed gain block, 16, providing for tangential rejection of receiver noise in an attenuator which allows for reduction of receiver gain from that provided by circuit block 16; a square law detector 14 which provides an output representing the estimate of rainfall density or alternatively, scattering coefficient of the target $\sigma(t)$ at time t; a timing base or synchronization signal $t_o$ which provides for the initiation of the sensitivity time control function of the attenuator; and precipitation induced attenuation compensating network, 18, which modifies said sensitivity time control function in accordance with equations (4) and (9).

Figure 2:
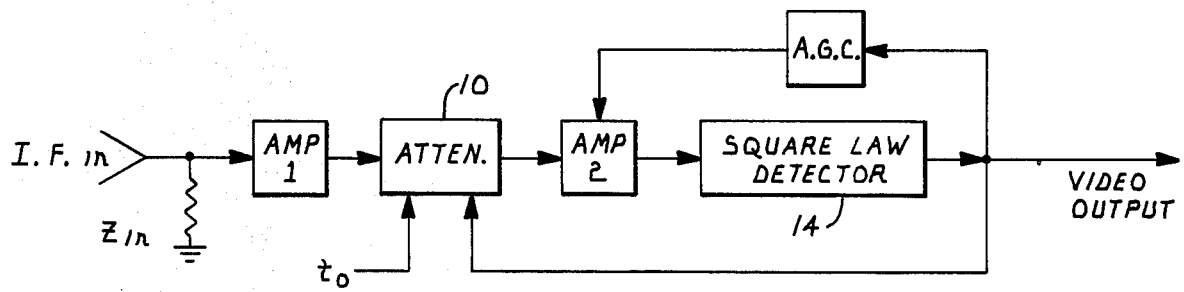
FIG. 2 is a block diagram of a practical radar receiver in accordance with the present invention.

Referring now more particularly to the drawings, wherein like numerals represent like elements throughout the several views, FIG. 2 illustrates a radar receiver in accordance with the present invention. The received signal after reduction to the intermediate frequency (IF) is supplied across input impedance $Z_{in}$ to the first amplifier. This amplifier would have fixed gain and low noise figure. Thus, the signal is supplied to attenuator 10, which compensates for changes in range and the path transmission coefficient and thereby effects the gain of the receiver circuitry in accordance with the second term of (5). The output of the attenuator is supplied to amplifier 2 which is part of the conventional automatic gain control circuitry well known to those of ordinary skill in the art. This AGC amplifier provides the required gain for tangential noise rejection, which, when considered in conjunction with amplifier 1, approximates the gain $G_o$. The output of the second amplifier is supplied to the square law detector 14 which supplies the video output. Part of the video output is supplied to the attenuator, as is a pulse timing input $t_o$. In a preferred embodiment, a typical weather radar has the values shown in Table 1, where F is the noise figure, B is the receiver band width, kTBF is the receiver noise, P is the density of light rain, and S/N is the signal-to-noise ratio.

TABLE 1

| System Characteristics | | |
| --- | --- | --- |
| $P_t$ | 5 KW | 37 dBW |
| $A_r$ | .025 M$^2$ | 25 dB Antenna Gain |
| F | 12.6 | 11 db (Noise Figure) |
| $\tau$ | 3.5 $\mu$s | |
| B | 650 KHz | |
| kTBF | $3.4 \times 10^{-14}$ W | $-134$ dBW |
| $2\pi c/P_t A_r \tau$ | $4.3 \times 10^{12}$ (WS$^2$Meters)$^{-1}$ | |
| $\sigma$ (light rain) | $6.3 \times 10^{-8}$ (Meters)$^{-1}$ | $-72$ dBM$^{-1}$ |
| S/N | 4 | 6 dB |

Assuming no intervening rain ($\gamma(\tau)=1$ for all $\tau$), the time $\tau$ at which any further increase in gain would cause the increased receiver noise to degrade the desired signal to noise ratio (s/N) can be calculated from (6):

$$(S/N)(kTBF)\left(\frac{2\pi c}{P_t A_r \tau}\right)\left(\frac{t_f}{v(t)}\right)^2_{v(t)=1} = \sigma \text{ (light rain)} \quad (6)$$

If the equation is solved for $t_f$ and the numbers inserted from the radar characteristics, a figure of $t_f = 328$ $\mu$S is reached. For such a receiver, the ideal compensation would consist of a gain block $G_1$ which has its gain set for the tangential rejection of receiver noise and an attenuation block whose voltage transmission characteristic increases linerally from zero at t=0 to unity at $t=t_f$ in the absence of a video output indicating weather echoes. After $t=t_f$, no additional compensation for path effects could be achieved in the receiver and the output would become uncalibrated. Additionally, the attenuation characteristics of the attenuation block should be modified in the event a video signal, or echoes, are received so as to decrease the amount of receiver attenuation in response to the path induced attenuation caused by the echo producing target.

The ideal attenuation T for the above disclosed receiver between t=0 and t=328 S is given by Equation 7.

$$T = \left(\frac{t}{t_f}\right)(v(t))^{-1} = \left(\frac{t}{t_f}\right)\exp\left[W\int_0^t \sigma(t)dt\right] \quad (7)$$

Attn = $T$ if $T < 1$
= 1 if $T \geq 1$

As noted above, the attenuation of the block is equal to T as long as T is less than 1 and equal to 1 if T is greater than or equal to 1.

Figure 3:
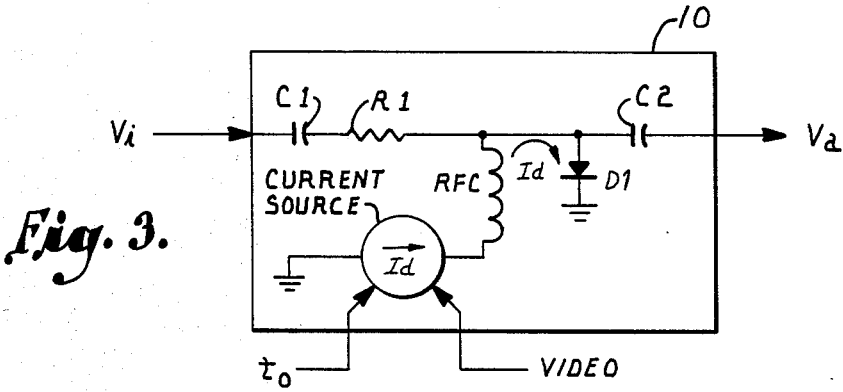
FIG. 3 is an electrical schematic of the attenuation block in FIG. 2.

FIG. 3 illustrates a preferred embodiment of the attenuation block shown in FIG. 2 with $V_i$ comprising receiver IF input and $V_a$ comprising the attenuated IF. It can be seen that C1, R1 and C2 comprise a fixed Alternating Current resistance with diode D1 comprising a variable Alternating Current resistance by means of current source $I_d$. The ratio of the attenuated signal $V_a$ to the input signal $V_i$ is equal to the attenuation T of the block. For the circuit shown in FIG. 3, the attenuation T is given by Equation 8, where K is a constant dependent upon the various component values.

$$T = \frac{V_a}{V_i} = \frac{1}{1 + KI_d} \approx \left(\frac{t}{t_f}\right)(v(t))^{-1} \quad (8)$$

It is necessary that the current source drive the attenuator diode D1 such that the attenuation is a reasonable approximation to the ideal attenuation set forth in Equation 7, which can be rewritten as Equation 9, as follows:

$$KI_d = v(t)\left(\frac{t_f}{t}\right) - 1 \quad (9)$$

In the absence of echoes, this current is a hyperbolically decaying current which intersects the time axis at $t = 328 \, \mu S$. This hyperbolically decaying current can be approximated by utilizing two resistor/capacitor networks having different time constants and different magnitudes of current therethrough which are summed together.

$\gamma(t)$ is a multiplying term (in Equation 9) which decreases from unity in a continuous fashion in the presence of echoes and which remains constant in the absence of echoes (or video returns). The effect on $I_d$ is to increase the rate of decay of the exponentially decaying currents. This may be accomplished by draining charges from the capacitors sourcing $I_d$ through an auxillary shunt path. However, the precise computation of $\gamma(t)$ and the provision for a shunt path which exactly duplicates the response required by Equation 9 is quite complex and a simpler approximate alternative solution has been used in the preferred implementation. It has been found that utilizing a constant shunt path whenever the video data indicates that the rain intensity exceeds the level corresponding to moderate rain will provide appropriate attenuation correction. This was determined empirically based on the visual response and performance under actual operating conditions.

Figure 4:
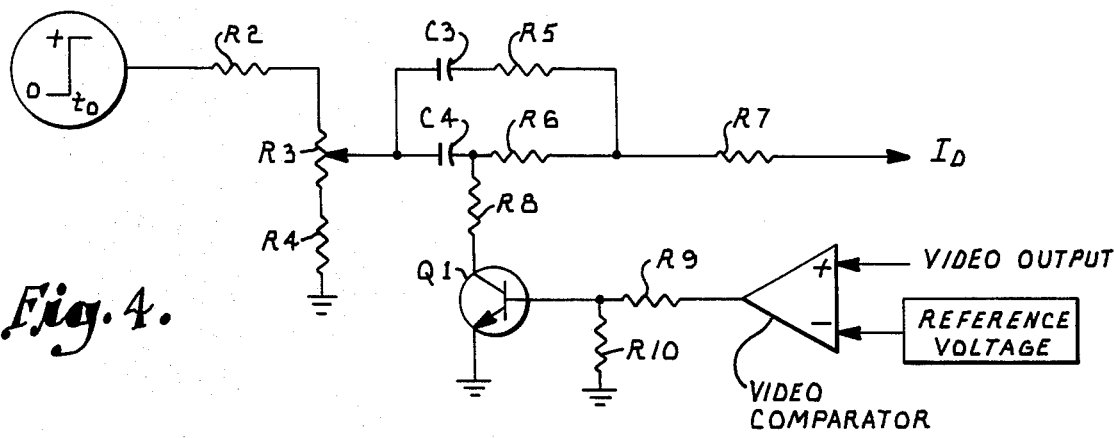
FIG. 4 is an electric schematic of the current source block in FIG. 3.

FIG. 4 is a circuit diagram of the current source $I_d$ shown in FIG. 3. The timing signal $t_0$ provides a positive going 24-volt pulse at $t = 0$ and the voltage divider comprised of resistors R2, R3 and R4 provides a voltage at the R3 pickoff. This voltage charges the RC networks comprised of C3 and R5 and C4 and R6, respectively. Resistor R7 serves as the summing resistor for the resultant currents flowing from the two RC networks.

The constant shunt path utilized whenever the reply data indicates an intensity greater than that corresponding to moderate rain is provided through resistor R8 and transistor Q1. It can be seen that when transistor Q1 conducts, the shunting of the charge current through R8 instead of R6 will result in C4 charging more quickly, with the result that the current $I_d$ drops off more rapidly, as is desired. The video output is compared with a predetermined reference voltage (equal of the video output when the rain intensity corresponds to moderate rain). When the video comparator conducts through resistors R9 and R10, transistor Q1 is biased into conduction, shunting current from one of the two RC networks.

The source of reference voltage could be a simple voltage divider connected between a constant voltage source and ground. Other modifications of the above circuitry will be readily apparent to one of ordinary skill in the art, in view of the above disclosure. The circuit specifically disclosed in FIG. 4 was found to be advantageous with the weather radar system parameters disclosed in Table 1. However, approximations, other parameters, and/or circuit arrangements may be more advantageous for a weather radar system having different transmitter/receiver characteristics. Therefore, the apparatus and method for the correction of attenuation-induced errors in a weather radar receiver described above is not limited to the specific examples expressed herein, and the invention is only limited in accordance with the appended claims.

| GLOSSARY OF SYMBOLS | |
|---|---|
| $\rho$ | Rain Density |
| $\tau$ | Pulse Duration |
| c | Velocity of Light |
| $P_t$ | Power Transmitted by the Source |
| $P_s$ | Power Scattered by a Region |
| $P_i$ | Power Incident on a Region |
| P | Power Lost (absorbed) in a Region |
| $P_p$ | Power Propagated Through a Region |
| $A_r$ | Effective Aperture of Receiving Antenna |
| R | Range Radar |
| $\sigma^o$ | Differential Scattering Coefficient |
| $\hat{\sigma}$ | Estimate of $\sigma$ |
| $\lambda^o$ | Differential Loss (absorption) Coefficient |
| $\lambda$ | Volumetric Loss (absorption) Coefficient |
| $\lambda'$ | Effective Volumetric Loss Coefficient |
| $K\sigma$ | Constant of Proportionality: $\sigma = \rho K\sigma$ |
| $K\lambda$ | Constant of Proportionality: $\lambda = \rho K\lambda$ |
| $v$ | Path Transmission Coefficient |
| $G_o$ | Fixed Component of Receiver Gain $= \left(\frac{2\pi c}{P_t A_r \tau}\right)$ |
| W | Emperical Constant $= \left(\frac{c}{2}\left(1 + \frac{K\lambda}{K\sigma}\right)\right)$ |
| $\sigma$ | Volumetric Scattering Coefficient |

From the foregoing, it will be seen that this invention is one well adapted to attain all the ends and objects hereinabove set forth together with the other advantages which are obvious and which are inherent to the structure.

It will be understood that certain features and subcombinations are of utility and may be employed without reference to other features and subcombinations. This is contemplated by and is within the scope of the invention.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. In a weather radar system which transmits radar signals and receives reflected signals and which is subject to attenuation-induced errors resulting from precipitation in the signal path, the improved apparatus for correcting the errors comprising:

a fixed gain circuit for the received signal operating thereon to produce an output signal having a substantially constant gain $G_0$ dependent upon characteristics of the radar system;

attenuator means for attenuating the output signal of the fixed gain circuit by an attenuation factor $$[(t \exp[W\int_o^t \hat{\sigma}(t)dt])^{-1}(t/t_f)\exp[W\int_o^t \hat{\sigma}(t)dt]$$

when the condition $t < t_f$ exists, where t is the elapsed time since emission of the transmitted signal;

t is the elapsed time since emission of the transmitted signal;

W is an empirical constant;

$\hat{\sigma}$(t) is an estimate of the target volumetric scattering coefficient at time t; and $t_f$ is the time after which further gain effects an unacceptable signal to noise ratio.

2. The invention of claim 1, wherein said attenuator means includes:

a voltage divider having first and second circuit branches, said first branch having a fixed AC resistance and said second branch having a variable AC resistance including an attenuator diode;

a current source providing a current which decays substantially hyperbolically; and means for applying said hyperbolically decaying current to said attenuator diode.

3. The invention of claim 2, wherein said current source includes:

a pair of resistor/capacitor networks arranged in parallel;

means for applying a voltage to said networks; and means for summing the current through said networks to provide said hyperbolically decaying current.

4. The invention of claim 3, including:

means for providing a normally interrupted shunt path between one of said networks and ground; and means for completing said shunt path in response to precipitation in excess of preselected intensity.

5. In a weather radar system which transmits radar signals and receives reflected signals and which is subject to attenuation-induced errors resulting from precipitation in the signal path, the improved apparatus for correcting the errors comprising:

fixed gain means for producing from the received signal an output signal having a substantially fixed gain $G_0$ dependent upon characteristics of the radar system; and attenuator means for attenuating the output signal from said fixed gain means to provide an attenuated signal, said attenuator means including a voltage divider having a first circuit branch with a fixed AC resistance and a second circuit branch with a variable AC resistance including an attenuator diode, said attenuator means further including a current source for generating and applying to said attenuator diode a current which approximates a hyperbolically decaying current, whereby the attenuated signal is substantially corrected for the errors resulting from precipitation in the signal path.

6. The invention of claim 5, wherein said current source includes:

a pair of resistor/capacitor networks arranged in parallel;

means for applying a voltage to said networks; and means for summing the current through said networks to provide said hyperbolically decaying current.

7. The invention of claim 6, including:

means for providing a normally interrupted shunt path between one of said networks and ground; and means for completing said shunt path in response to precipitation in excess of preselected intensity.

8. A method of correcting a received signal in a weather radar system subject to attenuation-induced signal error resulting from precipitation within the signal propagation path, said method comprising the steps of:

controlling the gain of the received signal by a fixed factor $G_0$ which is dependent upon characteristics of the radar system; and attenuating the signal by an attenuation factor $$[(t \exp [W \int_0^t \hat{\sigma}(t) dt])^?] (t/t_f) \exp[W \int_0^t \hat{\sigma}(t) dt]$$

when the condition $t < t_f$ exists, where t is the elapsed time since emission of the transmitted signal;

W is an empirical constant;

$\hat{\sigma}$(t) is an estimate of the target volumetric scattering coefficient at time t; and $t_f$ is the time after which further gain effects an unacceptable signal to noise ratio.

* * * * *